(12) United States Patent
An et al.

(10) Patent No.: US 12,365,238 B2
(45) Date of Patent: Jul. 22, 2025

(54) VEHICLE REAR BODY STRUCTURE

(71) Applicants: Hyundai Motor Company, Seoul (KR); Kia Corporation, Seoul (KR)

(72) Inventors: Yong Dok An, Anyang-si (KR); Seongwook Seo, Hwaseong-si (KR); Byeongdo An, Anyang-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 542 days.

(21) Appl. No.: 17/947,378

(22) Filed: Sep. 19, 2022

(65) Prior Publication Data

US 2023/0398859 A1 Dec. 14, 2023

(30) Foreign Application Priority Data

Jun. 8, 2022 (KR) .................. 10-2022-0069677

(51) Int. Cl.
| | |
|---|---|
| B60K 15/07 | (2006.01) |
| B60K 1/04 | (2019.01) |
| B60K 15/03 | (2006.01) |
| B62D 21/11 | (2006.01) |
| B62D 25/08 | (2006.01) |
| B62D 25/20 | (2006.01) |
| B62D 27/00 | (2006.01) |

(52) U.S. Cl.
CPC .............. *B60K 15/07* (2013.01); *B60K 1/04* (2013.01); *B62D 21/11* (2013.01); *B62D 25/08* (2013.01); *B62D 25/2009* (2013.01); *B62D 27/00* (2013.01); *B60K 2001/0438* (2013.01); *B60K 2015/03315* (2013.01)

(58) Field of Classification Search
CPC .... B60K 15/07; B60K 15/067; B60K 15/063; B60K 15/00; B60K 15/03006; B62D 21/11
See application file for complete search history.

(56) References Cited

U.S. PATENT DOCUMENTS

| | | | | |
|---|---|---|---|---|
| 5,518,272 A | * | 5/1996 | Fukagawa | B60K 15/07 180/69.5 |
| 5,794,979 A | * | 8/1998 | Kasuga | B60K 15/013 180/69.5 |
| 5,997,040 A | * | 12/1999 | Fukagawa | B60K 15/07 180/69.5 |
| 6,824,168 B2 | * | 11/2004 | Kawazu | B62D 21/11 280/834 |

(Continued)

FOREIGN PATENT DOCUMENTS

| | | | | |
|---|---|---|---|---|
| CN | 107176030 A | * | 9/2017 | ............ B60K 15/07 |
| DE | 112008002821 T5 | * | 2/2011 | ............ B60K 15/07 |

(Continued)

*Primary Examiner* — Steve Clemmons
(74) *Attorney, Agent, or Firm* — Slater Matsil, LLP

(57) ABSTRACT

An embodiment vehicle rear body structure includes a partition panel coupled to a boundary point of a vehicle body intermediate portion and a vehicle body rear portion, a first mount assembly connected to the partition panel and configured to support a hydrogen tank, and a second mount assembly connected to a rear cross member provided in the vehicle body rear portion and configured to support the hydrogen tank at a position lower than the first mount assembly.

20 Claims, 7 Drawing Sheets

(56) References Cited

U.S. PATENT DOCUMENTS

| | | | | |
|---|---|---|---|---|
| 7,264,277 B2* | 9/2007 | Ono | ................ | B60K 15/07 |
| | | | | 280/783 |
| 7,926,601 B2* | 4/2011 | Ono | ................ | B60L 50/72 |
| | | | | 180/68.5 |
| 9,290,091 B2* | 3/2016 | Lee | ................ | B60K 15/067 |
| 9,604,673 B2* | 3/2017 | An | ................ | B62D 21/152 |
| 9,738,154 B2* | 8/2017 | Green | ................ | B60K 15/07 |
| 9,868,471 B2* | 1/2018 | An | ................ | B62D 25/088 |
| 9,950,643 B2* | 4/2018 | Ishijima | ................ | B60N 2/28 |
| 10,556,506 B2* | 2/2020 | Sasaki | ................ | F17C 13/084 |
| 11,312,244 B2* | 4/2022 | Miyaki | ................ | B60L 50/50 |
| 2011/0259933 A1* | 10/2011 | Dossow | ................ | B60K 15/067 |
| | | | | 224/538 |
| 2012/0080466 A1* | 4/2012 | Schultheis | ................ | F17C 13/084 |
| | | | | 224/400 |
| 2012/0161430 A1* | 6/2012 | Mulanon | ................ | F17C 13/084 |
| | | | | 280/834 |
| 2014/0375043 A1* | 12/2014 | Finck | ................ | B60K 15/07 |
| | | | | 220/562 |
| 2015/0107693 A1* | 4/2015 | Green | ................ | B60K 15/07 |
| | | | | 137/351 |
| 2016/0244103 A1* | 8/2016 | Amemiya | ................ | B62D 21/00 |
| 2017/0036536 A1* | 2/2017 | Green | ................ | B66F 9/07 |
| 2020/0207423 A1* | 7/2020 | Saeki | ................ | B62D 25/20 |
| 2023/0202578 A1* | 6/2023 | Maruyama | ................ | B62D 25/2009 |
| | | | | 296/193.07 |
| 2025/0121890 A1* | 4/2025 | Zhang | ................ | B62D 25/16 |

FOREIGN PATENT DOCUMENTS

| | | | | | |
|---|---|---|---|---|---|
| DE | 102014207555 A1 | * | 10/2015 | ............ | B60K 15/07 |
| JP | 2004161092 A | * | 6/2004 | ............ | B60K 1/04 |
| JP | 4038036 B2 | * | 1/2008 | | |
| JP | 2016117461 A | * | 6/2016 | ............ | B60J 7/143 |
| KR | 20090056412 A | * | 6/2009 | | |
| KR | 20120050646 A | * | 5/2012 | | |

\* cited by examiner

VEHICLE REAR BODY STRUCTURE

CROSS-REFERENCE TO RELATED APPLICATIONS

This application claims the benefit of Korean Patent Application No. 10-2022-006967, filed on Jun. 8, 2022, which application is hereby incorporated herein by reference.

TECHNICAL FIELD

The present disclosure relates to a vehicle rear body structure.

BACKGROUND

In general, environment-friendly vehicles include a hybrid vehicle, an electric vehicle, a hybrid electric vehicle, and a hydrogen powered vehicle (frequently called a "hydrogen electric vehicle" by a person of ordinary skill in the art).

In the hydrogen powered vehicle, various component parts such as a high voltage battery, a fuel cell stack, a drive motor, at least one hydrogen tank, and a cooling module are mounted on the vehicle body. Recently, hydrogen electric vehicle-based passenger vehicles have been introduced.

In the hydrogen electric vehicle-based passenger vehicle, at least one hydrogen tank is mounted on a lower portion of the vehicle body.

However, when at least one hydrogen tank is mounted on a lower portion of a conventional vehicle body, it is difficult to dispose other component parts, and accessibility of a worker in the assembling process is disadvantageous.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a vehicle rear body structure. Particular embodiments relate to a vehicle rear body structure capable of mounting at least one hydrogen tank.

Embodiments of the present disclosure provide a vehicle rear body structure capable of securing mounting strength of a hydrogen tank mounted on a vehicle body rear portion of a hydrogen electric vehicle-based passenger vehicle.

An exemplary vehicle rear body structure includes a partition panel coupled to a boundary point of a vehicle body intermediate portion and a vehicle body rear portion, a first mount assembly connected to the partition panel and configured to support at least one hydrogen tank, and a second mount assembly connected to a rear cross member provided in the vehicle body rear portion and configured to support the at least one hydrogen tank at a position lower than the first mount assembly.

A support point of the first mount assembly, a support point of the second mount assembly, and a center of mass point of the at least one hydrogen tank may be positioned on a straight line sloped downward from the vehicle body intermediate portion to the vehicle body rear portion.

An exemplary vehicle rear body structure may further include a rear floor structure coupled to a front portion of a rear side member respectively disposed at both sides in a vehicle width direction of the vehicle body rear portion and coupled to a lower portion of the partition panel.

An exemplary vehicle rear body structure may further include a lower cross member coupled to an upper portion of the rear floor structure along the vehicle width direction and coupled to the lower portion of the partition panel and an upper cross member coupled to an upper portion of the partition panel along the vehicle width direction and coupled to the first mount assembly.

An exemplary vehicle rear body structure may further include at least one mounting reinforce member coupled to the lower cross member, the upper cross member, and the partition panel in a vertical direction.

An exemplary vehicle rear body structure may further include a partition upper reinforce member coupled to a roof side and the upper cross member in a diagonal direction.

An exemplary vehicle rear body structure may further include a rear shock absorber upper reinforce member coupled to the rear side member in a vertical direction.

An exemplary vehicle rear body structure may further include a rear stiff bar coupled to the upper cross member and an upper portion of the rear shock absorber upper reinforce member along a vehicle body length direction.

The first mount assembly may include at least one first mounting cross member coupled to at least one tank supporting member and a pair of first mounting brackets coupled to the at least one first mounting cross member and coupled to the upper cross member.

The second mount assembly may include at least one second mounting cross member coupled to at least one tank supporting member, a pair of second mounting brackets coupled to the at least one second mounting cross member and coupled to the rear cross member at a rear of the partition panel, and at least one third mounting cross member coupled to the pair of second mounting brackets.

The rear floor structure may be coupled to a center floor panel provided in the vehicle body intermediate portion and a front portion of the rear side member.

The rear floor structure may include a rear floor panel of a dome shape coupled to the lower cross member and the lower portion of the partition panel.

A battery may be disposed below the rear floor panel.

According to an embodiment, the ability to install at least one hydrogen tank to the vehicle body is improved, the mounting strength may be increased, and simultaneously, the structural strength and rear collision stability of the vehicle body rear portion may be secured.

Other effects that may be obtained or are predicted by an exemplary embodiment will be explicitly or implicitly described in a detailed description of embodiments of the present invention. That is, various effects that are predicted according to an exemplary embodiment will be described in the following detailed description.

BRIEF DESCRIPTION OF THE DRAWINGS

The embodiments herein may be better understood by referring to the following description in conjunction with the accompanying drawings in which like reference numerals indicate identical or functionally similar elements.

It should be understood that the above-referenced drawings are not necessarily to scale, presenting a somewhat simplified representation of various preferred features illustrative of the basic principles of embodiments of the disclosure. The specific design features of embodiments of the present disclosure, including, for example, specific dimensions, orientations, locations, and shapes, will be determined in part by the particular intended application and use environment.

DETAILED DESCRIPTION OF ILLUSTRATIVE EMBODIMENTS

The terminology used herein is for the purpose of describing specific examples only and is not intended to be limiting of the disclosure. As used herein, the singular forms are intended to include the plural forms as well, unless the context clearly indicates otherwise. As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or indirectly connected through one or more intermediary components, by welding, self-piercing rivet (SPR), structural adhesive, and the like.

It is understood that the term "vehicle," "vehicular," "car," or other similar term as used herein is inclusive of, in general, passenger automobiles including sports cars, sport utility vehicles (SUVs), buses, trucks, various commercial vehicles, and inclusive of hybrid vehicles, electric vehicles, hybrid electric vehicles, hydrogen-powered vehicles, purpose-built vehicles (PBVs), and other alternative fuel vehicles (e.g., fuels derived from resources other than petroleum).

Hereinafter, embodiments of the present disclosure are described in detail with reference to the accompanying drawings.

Figure 1:
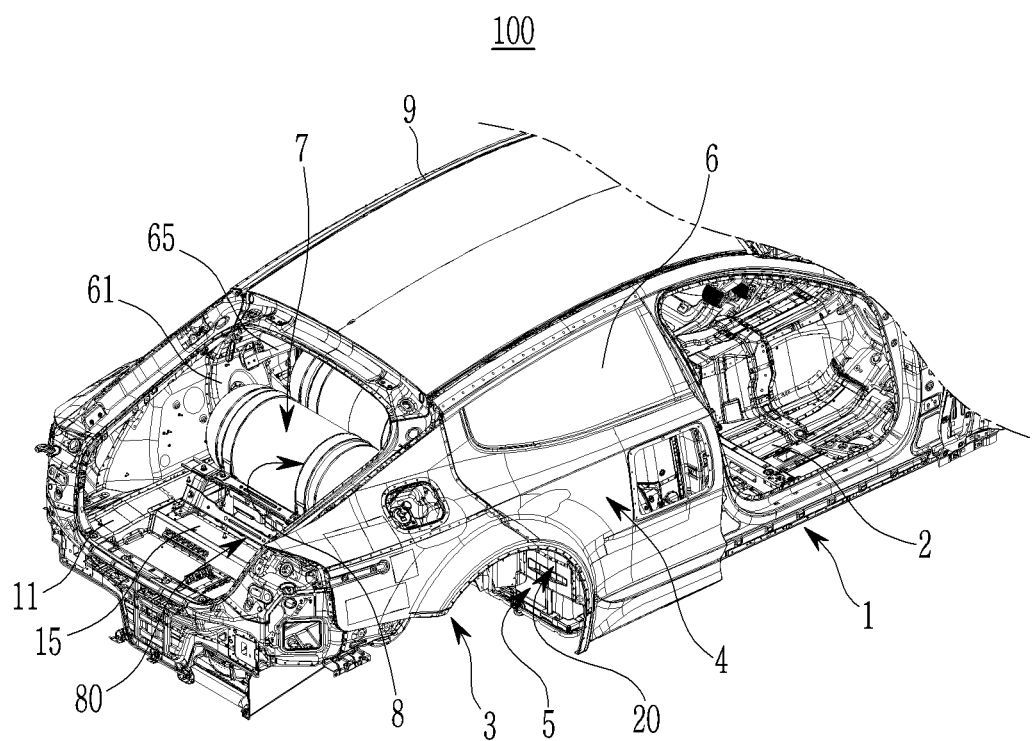
FIG. 1 to FIG. 4 respectively illustrate a vehicle rear body structure according to an exemplary embodiment.
Figure 2:
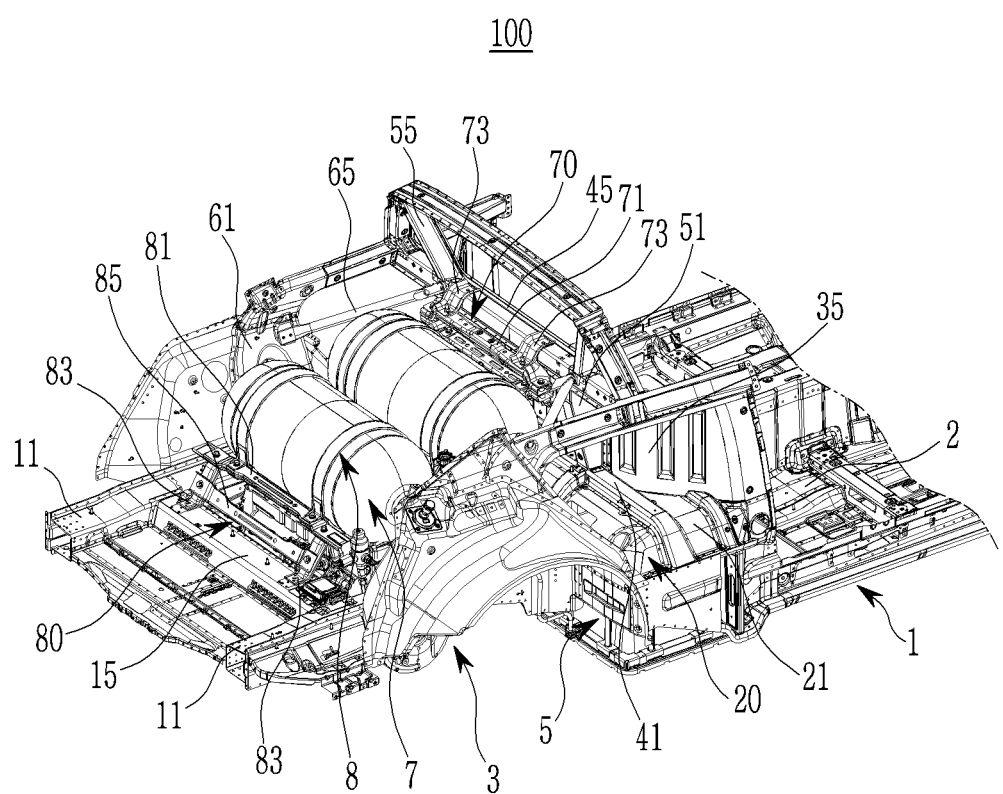
Figure 3:
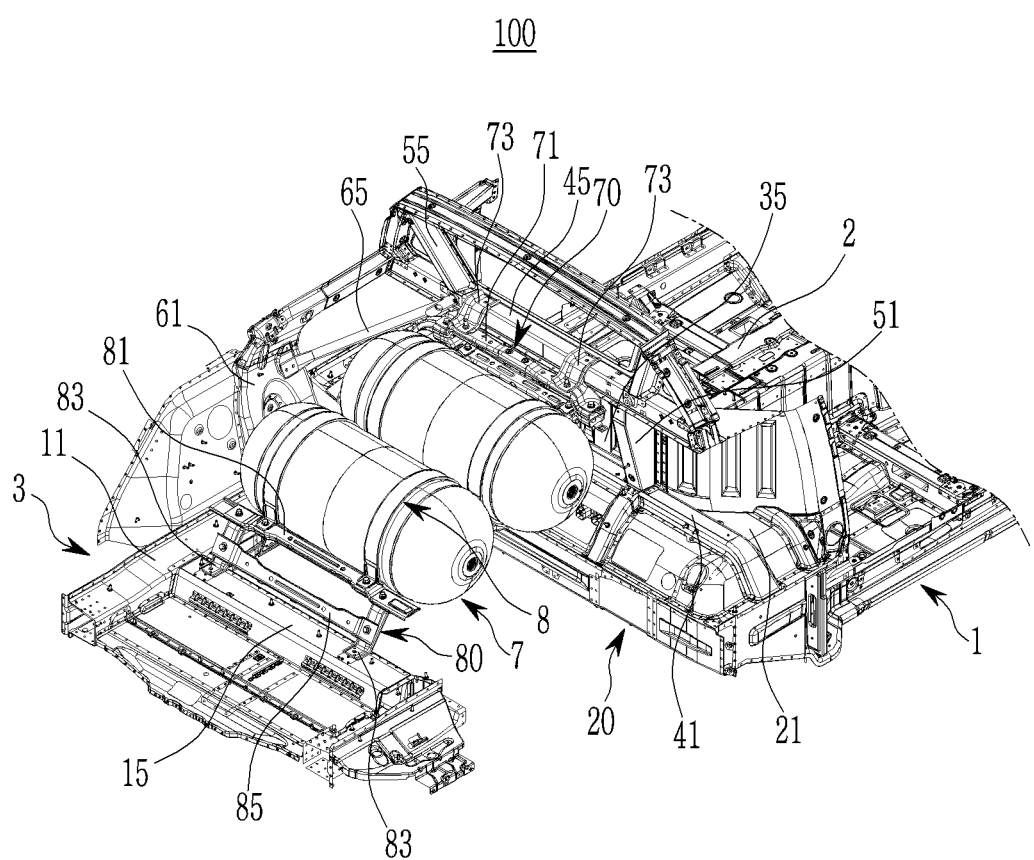
Figure 4:
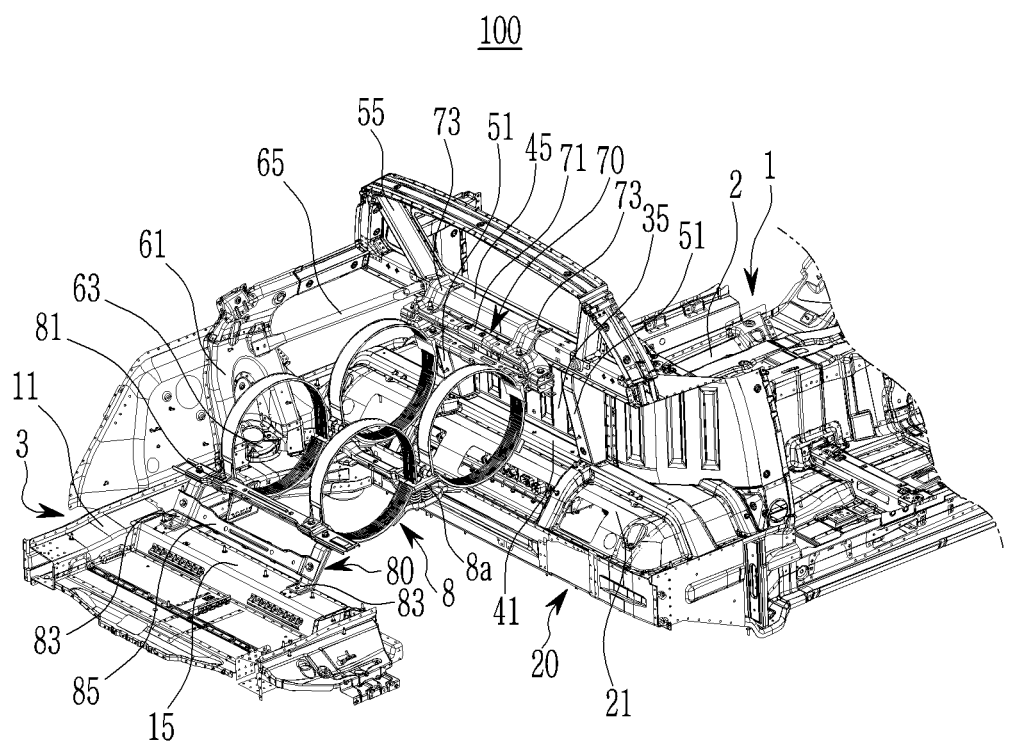
Figure 5:
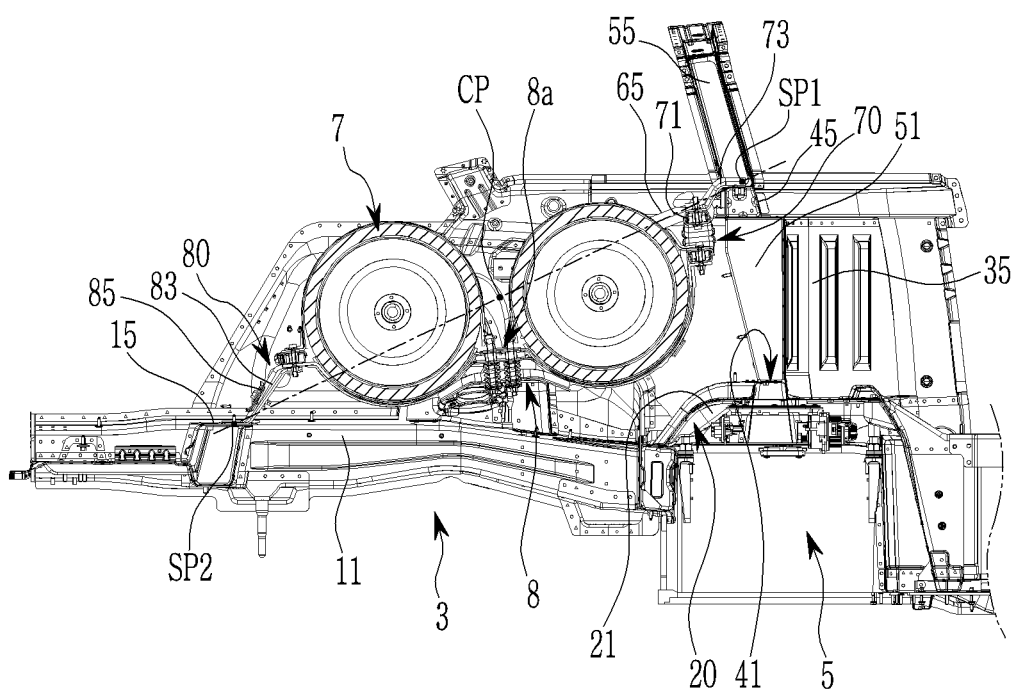
FIG. 5 is a cross-sectional view showing a vehicle rear body structure according to an exemplary embodiment.

FIG. 1 to FIG. 4 respectively illustrate a vehicle rear body structure according to an exemplary embodiment, and FIG. 5 is a cross-sectional view showing a vehicle rear body structure according to an exemplary embodiment.

Referring to FIG. 1 to FIG. 5, a vehicle rear body structure 100 according to an exemplary embodiment may be applied to a vehicle body of an electric vehicle, more specifically, a hydrogen electric vehicle-based passenger vehicle (e.g., a sedan, a coupe, a sports car).

The vehicle body of the hydrogen electric vehicle-based passenger vehicle includes a vehicle body intermediate portion 1 forming a room for occupants and a vehicle body rear portion 3 to which the vehicle rear body structure 100 according to an exemplary embodiment is applied.

Various component parts, such as a battery 5 of a high voltage, a fuel cell stack (not shown), a drive motor (not shown), an inverter (not shown), at least one hydrogen tank 7, and a cooling module (not shown), are mounted on the vehicle body of the hydrogen electric vehicle-based passenger vehicle.

The vehicle rear body structure 100 according to an exemplary embodiment is configured to mount the at least one hydrogen tank 7 on the vehicle body rear portion 3. In an example, the at least one hydrogen tank 7 may include a pair of hydrogen tanks.

In this specification, the term "vehicle length direction" may refer to a length direction of the vehicle body, the term "vehicle width direction" may refer to a width direction of the vehicle body, and the term "vertical direction" may refer to a height direction of the vehicle body.

Furthermore, in this specification, "upper end portion", "upper portion", "upper end", or "upper portion surface" of a component indicates an end portion, portion, end, or surface of the component that is relatively positioned higher in the drawing, and "lower end portion", "lower portion", "lower end", or "lower portion surface" of a component indicates an end portion, portion, end, or surface of the component that is relatively positioned lower in the drawing.

In addition, in this specification, "end" (for example, one end, another end, or the like) of a component indicates an end of the component in any direction, and "end portion" (for example, one end portion, another end portion, or the like) of a component indicates a certain part of the component including the end.

The vehicle rear body structure 100 according to an exemplary embodiment is structured such that the mounting strength of the at least one hydrogen tank 7 mounted on the vehicle body rear portion 3 may be secured.

For such a purpose, the vehicle rear body structure 100 according to an exemplary embodiment includes a rear side member 11, a rear cross member 15, a rear floor structure 20, a partition panel 35, a first mount assembly 70, and a second mount assembly 80.

Furthermore, the vehicle rear body structure 100 according to an exemplary embodiment further includes a lower cross member 41, an upper cross member 45, at least one mounting reinforce member 51, a partition upper reinforce member 55, a rear shock absorber upper reinforce member 61, and a rear stiff bar 65.

In an exemplary embodiment, the rear side member 11 is respectively disposed at both sides in the vehicle width direction of the vehicle body rear portion 3 and is disposed along a vehicle body length direction.

In an exemplary embodiment, the rear cross member 15 is coupled to the rear side member 11 along the vehicle width direction at a rear of the partition panel 35 further described later.

In an exemplary embodiment, the rear floor structure 20 is disposed along the vehicle width direction and coupled to a front portion of the rear side member 11. The rear floor structure 20 may be coupled to a rear portion of a center floor panel 2 provided in the vehicle body intermediate portion 1.

Here, the rear floor structure 20 includes a rear floor panel 21 of a dome shape. The battery 5 mentioned above may be disposed under the rear floor panel 21.

In an exemplary embodiment, the partition panel 35 is configured to partition the vehicle body intermediate portion 1 and the vehicle body rear portion 3, respectively. The partition panel 35 is coupled to a boundary point of the vehicle body intermediate portion 1 and the vehicle body rear portion 3.

The partition panel 35 is disposed along the vehicle width direction at the boundary point of the vehicle body intermediate portion 1 and the vehicle body rear portion 3. The partition panel 35 is coupled to an upper portion of the rear floor structure 20 along the vertical direction. That is, a lower portion of the partition panel 35 is coupled to an upper portion of the rear floor panel 21.

In an exemplary embodiment, the lower cross member 41 is configured to reinforce the upper portion of the rear floor structure 20. The lower cross member 41 is coupled to the upper portion of the rear floor structure 20 along the vehicle width direction and coupled to the lower portion of the partition panel 35.

The lower cross member 41 may be coupled to an upper surface of the rear floor panel 21. In an example, a closed range of a rectangular cross-section may be formed between the lower cross member 41 and the upper surface of the rear floor panel 21.

In an exemplary embodiment, the upper cross member 45 is configured to reinforce an upper portion of the partition panel 35. The upper cross member 45 is coupled to the upper portion of the partition panel 35 along the vehicle width direction.

Both end portions of the upper cross member 45 may be coupled to a side panel 6 of a side structure 4 provided at both sides in the vehicle width direction of the vehicle body rear portion 3. In addition, the upper cross member 45 may be coupled to the first mount assembly 70 further described later.

The upper cross member 45 may be coupled to an upper surface of the partition panel 35. In an example, a closed range of a rectangular cross-section may be formed between the upper cross member 45 and the upper surface of the partition panel 35.

In an exemplary embodiment, the at least one mounting reinforce member 51 is configured to reinforce the lower cross member 41, the upper cross member 45, and the partition panel 35. The at least one mounting reinforce member 51 is coupled to the lower cross member 41, the upper cross member 45, and the partition panel 35 in the vertical direction.

The at least one mounting reinforce member 51 may be coupled to a rear surface of the partition panel 35. In an example, a closed range of a rectangular cross-section may be formed between the at least one mounting reinforce member 51 and the rear surface of the partition panel 35.

In an exemplary embodiment, the partition upper reinforce member 55 is configured to reinforce the upper portion of the partition panel 35 and the side structure 4.

The partition upper reinforce member 55 is coupled to a roof side 9 of the side structure 4 and the upper cross member 45 in a diagonal direction.

In an exemplary embodiment, the rear shock absorber upper reinforce member 61 is configured to reinforce a rear shock absorber mounting portion 63 coupled to the rear side member 11.

The rear shock absorber upper reinforce member 61 is disposed along the vertical direction, coupled to the rear side member 11, and coupled to the side structure 4.

In an exemplary embodiment, the rear stiff bar 65 is configured to reinforce structural strength of the vehicle body rear portion 3.

The rear stiff bar 65 is coupled to the upper cross member 45 and an upper portion of the rear shock absorber upper reinforce member 61 along the vehicle body length direction.

In an exemplary embodiment, the first mount assembly 70 and the second mount assembly 80 are configured to mount the at least one hydrogen tank 7 on the vehicle body rear portion 3.

The first mount assembly 70 is connected to the upper portion of the partition panel 35 and configured to support the at least one hydrogen tank 7.

Figure 6:
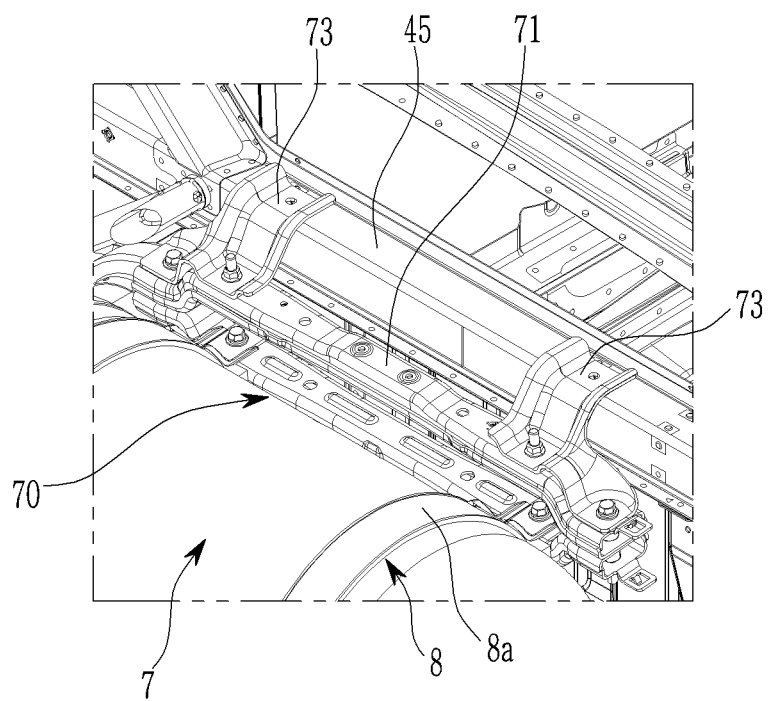
FIG. 6 illustrates a first mount assembly applied to a vehicle rear body structure according to an exemplary embodiment.

The first mount assembly 70 includes, as shown in FIG. 6, at least one first mounting cross member 71 and a pair of first mounting brackets 73.

The at least one first mounting cross member 71 is disposed along the vehicle width direction and coupled to at least one tank supporting member 8. Here, the at least one tank supporting member 8 may include a band assembly 8a known to a person of ordinary skill in the art.

The pair of first mounting brackets 73 is coupled to the at least one first mounting cross member 71 and coupled to the upper cross member 45.

In addition, the second mount assembly 80 is connected to the rear cross member 15 at a position lower than the first mount assembly 70 to support the at least one hydrogen tank 7. The second mount assembly 80 is connected to the rear cross member 15 at a rear of the partition panel 35.

Figure 7:
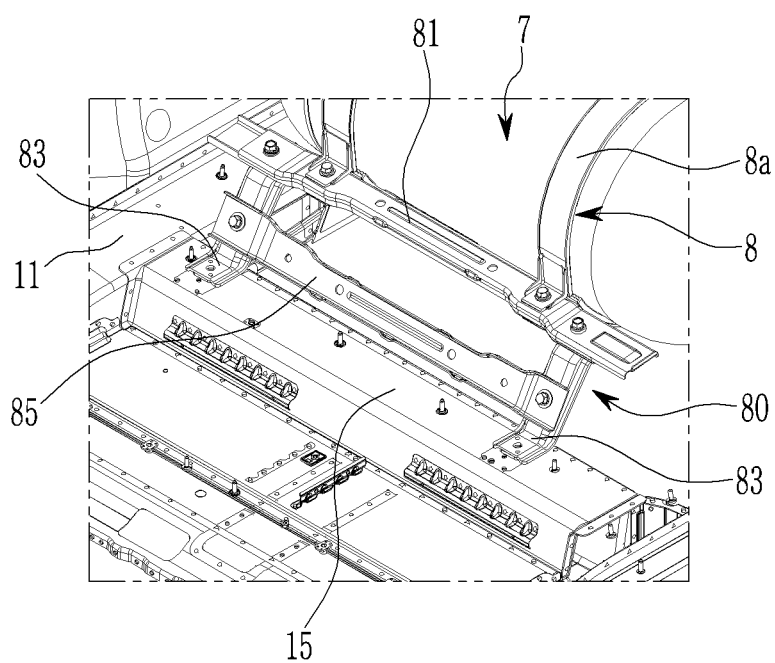
FIG. 7 illustrates a second mount assembly applied to a vehicle rear body structure according to an exemplary embodiment.

The second mount assembly 80 includes, as shown in FIG. 7, at least one second mounting cross member 81, a pair of second mounting brackets 83, and a third mounting cross member 85.

The at least one second mounting cross member 81 is disposed along the vehicle width direction and coupled to the at least one tank supporting member 8.

The pair of second mounting brackets 83 is coupled to the at least one second mounting cross member 81 and coupled to the rear cross member 15.

In addition, the third mounting cross member 85 is disposed along the vehicle width direction and coupled to the pair of second mounting brackets 83.

Here, as shown in FIG. 5, a support point SP1 of the first mount assembly 70, a support point SP2 of the second mount assembly 80, and a center of mass point CP of the at least one hydrogen tank 7 are positioned on a straight line SL sloped downward from the vehicle body intermediate portion 1 to the vehicle body rear portion 3.

The support point SP1 of the first mount assembly 70 may be defined as a mounting point of the pair of first mounting brackets 73 and the upper cross member 45. In addition, the support point SP2 of the second mount assembly 80 may be defined as a mounting point of the pair of second mounting brackets 83 and the rear cross member 15.

Hereinafter, the operation of the vehicle rear body structure 100 according to an exemplary embodiment is described in detail with reference to FIG. 1 to FIG. 7.

First, in the vehicle body rear portion 3, the first mount assembly 70 is coupled to the upper cross member 45 provided in the upper portion of the partition panel 35, and the second mount assembly 80 is coupled to the rear cross member 15.

Here, the first mount assembly 70 and the second mount assembly 80 are coupled to the tank supporting member 8. The tank supporting member 8 is disposed between the first mount assembly 70 and the second mount assembly 80. In addition, the first mount assembly 70 is positioned above the second mount assembly 80 by the upper cross member 45.

In such a state, the at least one hydrogen tank 7 is mounted on the tank supporting member 8. Accordingly, a forward side of the at least one hydrogen tank 7 is supported by the first mount assembly 70, and a rearward side of the at least one hydrogen tank 7 is supported by the second mount assembly 80.

Therefore, the at least one hydrogen tank 7 may be disposed above the rear side member 11 by the first mount assembly 70 and the second mount assembly 80.

Therefore, according to the vehicle rear body structure 100 according to an exemplary embodiment, a space where other component parts may be disposed may be secured under the vehicle body rear portion 3. For example, other component parts such as a drive motor (not shown) may be disposed under the rear side member 11.

In the vehicle rear body structure 100 according to an exemplary embodiment, a space where component parts may be mounted is secured in the vehicle body rear portion 3, and therefore, a passenger vehicle such as a sports car may be configured based on a hydrogen electric vehicle scheme without increasing the height of the vehicle body.

Meanwhile, according to the vehicle rear body structure 100 according to an exemplary embodiment, since the first mount assembly 70 is positioned above the second mount assembly 80, accessibility of assembly tools may be secured through the space between the at least one hydrogen tank 7 and the partition panel 35.

Furthermore, the support point SP1 of the first mount assembly 70, the support point SP2 of the second mount assembly 80, and the center of mass point CP of the at least one hydrogen tank 7 are positioned on the straight line SL sloped downward toward the rear.

Therefore, according to the vehicle rear body structure 100 according to an exemplary embodiment, the structural strength (e.g., vehicle body strength) of the vehicle body rear portion 3 and the mounting strength of the at least one hydrogen tank 7 may be increased.

In addition, according to the vehicle rear body structure 100 according to an exemplary embodiment, at a rear collision of the vehicle, a collision load may be transferred through a load path according to the straight line SL, and the roll movement of the at least one hydrogen tank 7 may be minimized, thereby increasing the collision stability of the at least one hydrogen tank 7.

On the other hand, since the first mount assembly 70 is coupled to the upper cross member 45 and the second mount assembly 80 is coupled to the rear cross member 15, the at least one hydrogen tank 7 may be connected along the vehicle width direction through the upper cross member 45 and the rear cross member 15.

In addition, since the rear stiff bar 65 is coupled to the rear shock absorber upper reinforce member 61 and the upper cross member 45, the at least one hydrogen tank 7 may be connected along the vehicle body length direction through the upper cross member 45, the rear shock absorber upper reinforce member 61, and the rear stiff bar 65.

Furthermore, the lower cross member 41, the upper cross member 45, and the at least one mounting reinforce member 51 are coupled to the partition panel 35, and the partition upper reinforce member 55 is coupled to the upper cross member 45 and the roof side 9. Accordingly, the at least one hydrogen tank 7 may be connected along the vertical direction through the partition panel 35, the lower cross member 41, the upper cross member 45, the at least one mounting reinforce member 51, and the partition upper reinforce member 55.

Therefore, according to the vehicle rear body structure 100 according to an exemplary embodiment, since the at least one hydrogen tank 7 is connected in the vehicle body length direction, the vehicle width direction, and the vertical direction, connectivity of the at least one hydrogen tank 7 to the vehicle body is improved, and simultaneously, sufficient mounting strength may be secured.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vehicle rear body structure comprising:
    a partition panel coupled to a boundary point of a vehicle body intermediate portion and a vehicle body rear portion;
    a first mount assembly connected to the partition panel and configured to support a hydrogen tank; and
    a second mount assembly connected to a rear cross member provided in the vehicle body rear portion and configured to support the hydrogen tank at a position lower than the first mount assembly.

2. The vehicle rear body structure of claim 1, wherein a support point of the first mount assembly, a support point of the second mount assembly, and a center of mass point of the hydrogen tank are positioned on an imaginary straight line sloped downward from the vehicle body intermediate portion to the vehicle body rear portion.

3. The rear vehicle body structure of claim 1, wherein the first mount assembly comprises:
    a first mounting cross member coupled to a tank supporting member; and
    a pair of first mounting brackets coupled to the first mounting cross member and coupled to an upper cross member, wherein the upper cross member is coupled to an upper portion of the partition panel along a vehicle width direction and coupled to the first mount assembly.

4. The rear vehicle body structure of claim 1, wherein the second mount assembly comprises:
    a second mounting cross member coupled to a tank supporting member;
    a pair of second mounting brackets coupled to the second mounting cross member and coupled to the rear cross member at a rear of the partition panel; and
    a third mounting cross member coupled to the pair of second mounting brackets.

5. A vehicle rear body structure comprising:
    a partition panel coupled to a boundary point of a vehicle body intermediate portion and a vehicle body rear portion;
    a first mount assembly connected to the partition panel and configured to support a hydrogen tank;
    a second mount assembly connected to a rear cross member provided in the vehicle body rear portion and configured to support the hydrogen tank at a position lower than the first mount assembly; and
    a rear floor structure coupled to a front portion of a rear side member respectively disposed at both sides of the vehicle body rear portion in a vehicle width direction and coupled to a lower portion of the partition panel.

6. The vehicle rear body structure of claim 5, further comprising:
    a lower cross member coupled to an upper portion of the rear floor structure along the vehicle width direction and coupled to the lower portion of the partition panel; and
    an upper cross member coupled to an upper portion of the partition panel along the vehicle width direction and coupled to the first mount assembly.

7. The vehicle rear body structure of claim 6, further comprising a mounting reinforce member coupled to the lower cross member, the upper cross member, and the partition panel in a vertical direction.

8. The vehicle rear body structure of claim 6, further comprising a partition upper reinforce member coupled to a roof side and the upper cross member in a diagonal direction.

9. The vehicle rear body structure of claim 6, further comprising a rear shock absorber upper reinforce member coupled to the rear side member in a vertical direction.

10. The vehicle rear body structure of claim 9, further comprising a rear stiff bar coupled to the upper cross member and an upper portion of the rear shock absorber upper reinforce member along a vehicle body length direction.

11. The vehicle rear body structure of claim 6, wherein the first mount assembly comprises:
a first mounting cross member coupled to a tank supporting member; and
a pair of first mounting brackets coupled to the first mounting cross member and coupled to the upper cross member.

12. The vehicle rear body structure of claim 6, wherein:
the rear floor structure comprises a rear floor panel of a dome shape coupled to the lower cross member and the lower portion of the partition panel; and
a battery is disposed below the rear floor panel.

13. The vehicle rear body structure of claim 5, wherein the rear floor structure is coupled to a center floor panel provided in the vehicle body intermediate portion and a front portion of the rear side member.

14. A vehicle comprising:
a vehicle body comprising an intermediate portion and a rear portion;
a partition panel coupled to a boundary point of the intermediate portion and the rear portion;
a first mount assembly connected to the partition panel;
a rear cross member provided in the rear portion;
a second mount assembly connected to the rear cross member;
a hydrogen tank supported by the first mount assembly and supported by the second mount assembly at a position lower than the first mount assembly;
rear side members respectively disposed at both sides of the rear portion in a vehicle width direction; and
a rear floor structure coupled to a front portion of the rear side members and coupled to a lower portion of the partition panel.

15. The vehicle of claim 14, wherein a support point of the first mount assembly, a support point of the second mount assembly, and a center of mass point of the hydrogen tank are positioned on an imaginary straight line sloped downward from the intermediate portion to the rear portion.

16. The vehicle of claim 14, further comprising:
a lower cross member coupled to an upper portion of the rear floor structure along the vehicle width direction and coupled to the lower portion of the partition panel; and
an upper cross member coupled to an upper portion of the partition panel along the vehicle width direction and coupled to the first mount assembly.

17. The vehicle of claim 16, further comprising a mounting reinforce member coupled to the lower cross member, the upper cross member, and the partition panel in a vertical direction.

18. The vehicle of claim 16, further comprising a partition upper reinforce member coupled to a roof side and the upper cross member in a diagonal direction.

19. The vehicle of claim 16, wherein the first mount assembly comprises:
a first mounting cross member coupled to a tank supporting member; and
a pair of first mounting brackets coupled to the first mounting cross member and coupled to the upper cross member.

20. The vehicle of claim 16, wherein:
the rear floor structure comprises a rear floor panel of a dome shape coupled to the lower cross member and the lower portion of the partition panel; and
a battery is disposed below the rear floor panel.

* * * * *